US012680055B2

(12) United States Patent
Kropf et al.

(10) Patent No.: US 12,680,055 B2
(45) Date of Patent: Jul. 14, 2026

(54) ANTHRACENE-9,10-DIONE DERIVATIVES AS PHOTOACTIVATORS IN DETERGENTS

(71) Applicant: HENKEL AG & CO. KGAA, Düsseldorf (DE)

(72) Inventors: Christian Kropf, Hilden (DE); Nadia Ledermann, Duisburg (DE)

(73) Assignee: HENKEL AG & CO. KGAA, Düsseldorf (DE)

( * ) Notice: Subject to any disclaimer, the term of this patent is extended or adjusted under 35 U.S.C. 154(b) by 157 days.

(21) Appl. No.: 18/560,997

(22) PCT Filed: Nov. 10, 2022

(86) PCT No.: PCT/EP2022/081485

§ 371 (c)(1),
(2) Date: Nov. 15, 2023

(87) PCT Pub. No.: WO2023/099154

PCT Pub. Date: Jun. 8, 2023

(65) Prior Publication Data

US 2024/0301329 A1 Sep. 12, 2024

(30) Foreign Application Priority Data

Dec. 3, 2021 (DE) .................... 10 2021 213 788.1

(51) Int. Cl.
*C11D 3/00* (2006.01)
*C11D 3/20* (2006.01)
*C11D 3/395* (2006.01)

(52) U.S. Cl.
CPC .......... *C11D 3/3955* (2013.01); *C11D 3/2072* (2013.01); *C11D 2111/12* (2024.01)

(58) Field of Classification Search
CPC . C11D 3/3955; C11D 3/2072; C11D 2111/12; C07C 2603/24; C07C 50/34
USPC .................................................. 510/301, 302
See application file for complete search history.

(56) References Cited

FOREIGN PATENT DOCUMENTS

WO 2004072217 A1 8/2004
WO WO 2006106049 A2 * 10/2006 .......... C08L 23/0815

OTHER PUBLICATIONS

STIC Search Report dated Nov. 25, 2025.*
J.Org. CHem. vol. 46, 1981 pp. 1057-1061.*
Drivas et al., "Natural anthraquinonoid colorants as platform chemicals in the synthesis of sustainable disperse dyes for polyesters", Dyes and Pigments, vol. 88, 2011; pp. 7-17.
International Search Report and Written Opinion for the corresponding International Application No. PCT/EP2022/081485; Date of Mailing: Jan. 26, 2023; 13 pages (with English translation of ISR).
Parham et al., :"o-Benzoylbenzoic Acids by the Reaction of Lithium 2-Lithiobenzoates with Acid Chlorides. A Contribution to the Chemistry of Alizarin and Podophyllotoxin", J. Org. Chem., vol. 46, 1981; pp. 1057-1061.

* cited by examiner

*Primary Examiner* — Eisa B Elhilo
(74) *Attorney, Agent, or Firm* — CANTOR COLBURN LLP

(57) ABSTRACT

Anthracene-9,10-dione derivatives are capable of producing bleach-active species under irradiation of visible light, which lead to an increase of the bleaching power during the washing of textiles.

14 Claims, No Drawings

ANTHRACENE-9,10-DIONE DERIVATIVES AS PHOTOACTIVATORS IN DETERGENTS

CROSS-REFERENCE TO RELATED APPLICATIONS

This application is a National Stage application of PCT/EP2022/081485, filed Nov. 10, 2022, which claims benefit of German Patent Application No. 10 2021 213 788.1 filed on Dec. 3, 2021, both of which are incorporated by reference herein in their entirety.

The present invention relates to the use of alkyloxy-substituted anthracene-9,10-diones as photobleaching agents for removing soiling from textile materials, and to detergents containing such photobleaching agents, as well as a method for removing soiling from textile materials using alkyloxy-substituted anthracene-9,10-diones in an aqueous washing liquid under light irradiation.

In addition to removing odors and possibly scenting the textiles, textile washing is generally primarily used to remove dirt of a wide variety of nature. This cleaning effect is supported by the use of bleaching agents, surfactants and builders in the washing solution, with the bleaching agent playing a significant role in removing colored stains in particular. In addition to reductive bleaches that are only very important, peroxygen compounds are generally used as bleaching agents, the oxidative bleaching performance of which is conventionally amplified by so-called bleach activators which, for example, form percarboxylic acids such as peracetic acid by perhydrolysis of carboxylic acid derivatives such as TAED, which are oxidation-stronger than the starting peroxygen compound. A plurality of metal complexes are also capable of increasing the bleaching performance of peroxygen compounds.

Alternatively, it has been proposed to form bleach-active species during the washing process by irradiation of compounds which pass through the irradiation in photo-excited states which are more reactive than the basic state. For example, it is known from WO 98/32826 A1 and the prior art cited therein that certain water-soluble phthalocyanine, naphthocyanin and metallocyanine compounds can be used as photobleach.

One disadvantage of such photo-bleach agents, which are also referred to synonymously as photoactivators, is the requirement of the action of high-energy electromagnetic radiation such as UV radiation, so that the bleach-active species are formed.

Surprisingly, it has been found that certain anthracene-9,10-dione derivatives are capable of being irradiated with visible light.

The invention firstly provides the use of alkyloxy-substituted anthracene-9,10-diones of the general formula (I),

I)

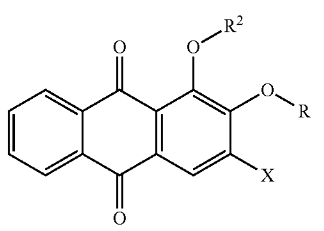

in which $R^1$ and $R^2$ independently of one another for H, $SO_3^-M^+$ or an optionally substituted linear or branched alkyl radical having 1 to 20 C atoms, preferably 8 to 16 C atoms, with the proviso that at least one of the radicals $R^1$ or $R^2$ is an optionally substituted linear or branched alkyl radical having 1 to 20 C atoms, preferably 8 to 6 C atoms, X is H or $SO_3^-M^+$ and $M^+$ stands for a proton, an alkali metal ion or an ammonium ion or mixtures thereof as photobleach to remove soiling of textile materials.

The soils are preferably those which contain polymerizable substances, in particular polymerizable dyes, the polymerizable dyes preferably being polyphenolic dyes, in particular flavonoids, especially anthocyanidins or anthocyanins or oligomers of these compounds. The soils are also preferably those which contain carotenoids and/or chlorophylls as dyes, i.e. dyes based on the porphyrin ring. In addition to the removal of soiling in the colors green, yellow, red or blue, the soiling is also considered in intermediate colors, in particular violet, lila, brown, purple paints or pink, and also of soiling which have a green, yellow, red, violet, lilla-colored, brown, purple-colored, pink-colored or blue tinting without substantially itself consisting of this color. The colors mentioned can also be in particular light or dark. These are preferably soils, in particular stains of grass, fruits or vegetables, in particular also soils by food products, such as for example spices, sauces, chutneys, curries, purees and jams, or beverages, for example coffee, tea, wine and juices, which contain corresponding green, yellow, red, violet, lila-colored, brown, purple, pink, and/or blue dyes. The soiling to be removed according to the invention can in particular be caused by cherries, morello, grapes, apples, pomegranates, aronia, plums, sea buckthorn, agai, kiwi, mango, grass, or berries, especially red or black currants, elderberries, blackberries, raspberries, blueberries, cranberries, cranberries, strawberries or blueberries, through coffee, tea, red cabbage, blood orange, eggplant, tomato, carrot, beetroot, spinach, pepper, red-fleshed or blue-fleshed potato, or red onion.

If, in the compounds of the general formula (I), a radical $R^1$ and/or $R^2$ is preferably substituted by substituents selected from —OH, $—COO^-M^+$, $—SO_3^-M^+$, $—OSO_3^-M^+$, $—N^+(CH_2CH_3)_3Hal^{--}$ and mixtures thereof, where $Hal^{--}$ for $Cl^{--}$, $Br^-$, $J^-$, $F^{--}$ and mixtures thereof and M and $Hal^-$ can also be missing if $—COO^-$, $—SO_3^-$, $—OSO_3^-$ and $—N^+(CH_2CH_3)_3$ is present in charge-balancing amount; it is also preferred if at least 1 substituent is terminal.

The alkyloxy-substituted anthracene-9,10-diones mentioned can be used according to the invention as such or in the form of detergents which contain them and optionally other conventional detergent ingredients.

A second subject of the invention is therefore a detergent containing an alkyloxy-substituted anthracene-9,10-dione defined above. Preferably, the detergent contains 0.00001 wt. % to 1 wt. %, in particular 0.001 wt. % to 0.1 wt. %, alkyloxy-substituted anthracene-9,10-dione.

Another subject is a method for removing soiling from textile materials using the alkyloxy-substituted anthracene-9,10-diones defined above in an aqueous washing liquid in which the soiled textile materials in need of washing are located, while irradiating the aqueous washing liquid with visible light.

Visible light is to be understood here to mean electromagnetic radiation visible to the human eye, the wavelength of which is in the range from 400 nm to 780 nm. Within the scope of the present invention, light in the wavelength range from 400 nm to 600 nm, in particular from 450 nm to 525 nm, is preferably used. This can be daylight or sunlight, or artificially generated light, the latter preferably being produced with the aid of an LED lamp. In the context of the method according to the invention, the light acts on the washing liquid in which the laundry materials which are in need of washing and the alkyloxy-substituted anthracene-9,10-dione are located. This can be done, for example, by manually performing the washing process in an open container, the opening of which is exposed to natural daylight or sunlight. The use of a conventional washing machine is also possible if it has a so-called porthole through which light enters the interior of the machine and the washing liquid located therein. The use of alternative light sources, for example of LEDs, is also possible, wherein when a washing machine is used, the light source is preferably arranged in the interior of the machine in such a manner that it irradiates the washing liquid at least temporarily, for example during the circulation thereof. In the latter variant, it is also possible not to operate the light source over the entire period of the washing process, but only for a part thereof, so that the oxidative bleaching takes place only during this partial period.

In the context of the use according to the invention and the process according to the invention, it is preferred to use the stated alkyloxy-substituted anthracene-9,10-dione in concentrations in the range from 0.0001 mmol/l to 0.1 mmol/l, in particular from 0.001 mmol/l to 0.01 mmol/l in aqueous washing liquor.

The detergent can be present in any dosage form established in the state of the art and/or any convenient dosage form. These include, for example, solid, powdery, liquid, gel-like or pasty dosage forms, optionally also composed of several phases; further include, for example, extrudates, granules, tablets or Pouches, both in large packs and in portions. In a preferred embodiment, the agent is liquid.

The method according to the invention is carried out and the use according to the invention is carried out in a respectively preferred embodiment by the use of a washing and cleaning agent according to the invention which contains no bleaching agents. This means that the agent contains no bleaching agents in the narrower sense, that is, hypochlorites or peroxygen compounds.

In a particularly preferred embodiment, the detergent is a liquid textile detergent.

Detergents according to the invention can contain customary other components of textile washing agents, in particular selected from the group of builders, surfactants, polymers, enzymes, fragrances and perfume carriers, via the alkyloxy-substituted anthracene-9,10-dione essential to the invention.

The builders include in particular zeolites, silicates, carbonates, organic cobuilders and—provided there are no ecological concerns about their use—also phosphates.

The finely crystalline, synthetic and bound water-containing zeolite is preferably zeolite A and/or zeolite P. Zeolite MAC® (commercial product from Crosfield) is suitable as zeolite P. However, zeolite X and mixtures of zeolite A, x and/or P are also suitable commercially and can be used in the context of the present invention, for example also a co-crystallizate of zeolite X and zeolite A (about 80 wt. % of zeolite X), which can be described by the formula $$n\mathrm{Na_2O}\cdot(1-n)\mathrm{K_2O}\cdot\mathrm{Al_2O_3}\cdot(2-2.5)\mathrm{SiO_2}\cdot(3.5-5.5)\mathrm{H_2O}.$$

In this case, the zeolite can be used both as a builder in a granular compound and also for a kind of "powder removal" of a granular mixture, preferably a mixture to be pressed, wherein both ways are usually used to incorporate the zeolite into the premix. Zeolites can have an average particle size of less than 10 μm (volume distribution; measurement method: Coulter Counter) and preferably contain 18 wt. % to 22 wt. %, in particular 20 wt. % to 22 wt. %, of bound water.

Also crystalline layered silicates of the general formula $NaMSi_xO2_{2x+1}\cdot y\ H_2O$ can be used, where M represents sodium or hydrogen, x is a number from 1.9 to 22, preferably from 1.9 to 4, wherein 2, 3, or 4 are particularly preferred values for x, and y represents a number from 0 to 33, preferably from 0 to 20. The crystalline layered silicates of the formula $NaMSi_xO_{2x+1}\cdot y\ H_2O$ are sold, for example, by Clariant GmbH (Germany) under the trade name Na-SKS. Examples of these silicates are Na-SKS-1 ($Na_2Si_{22}O_{45}\cdot x\ H_2O$, kenyaite), Na-SKS-2 ($Na_2Si_{14}O_{29}\cdot x\ H_2O$, magadiite), Na-SKS-3 ($Na_2Si_8O_{17}\cdot x\ H_2O$) or Na-SKS-4 (Na2Si4O9·x H2O, macatite)

Crystalline sheet silicates of the formula $NaMSi_xO_{2x+1}\cdot y\ H_2O$, in which x is 2, are particularly suitable. In particular, both β- and δ-sodium disilicates $Na_2Si_2O_5\cdot y\ H_2O$ and, above all, Na-SKS-5 ($\alpha$-$Na_2Si_2O_5$), Na-SKS-7 ($\beta$-$Na_2Si_2O_5$, natrosilite), Na-SKS-9 ($NaHSi_2O_5\cdot H_2O$), Na-SKS-10 ($NaHSi_2O_5\cdot 3\ H_2O$, kanemite), Na-SKS-11 (t-$Na_2Si_2O_5$) and Na-SKS-13 ($NaHSi_2O_5$), but in particular Na-SKS-6 ($\delta$-$Na_2Si_2O_5$) are preferred. Detergents preferably contain a proportion by weight of the crystalline layered silicate of the formula $NaMSi_xO_{2x\ 1}\cdot y\ H_2O$ from 0.1 wt. % to 20 wt. %, preferably from 0.2 wt. % to 15 wt. %, and in particular from 0.4 wt. % to 10 wt. %.

It is also possible to use amorphous sodium silicates with an $Na_2O:SiO_2$ modulus of from 1:2 to 1:3.3, preferably from 1:2 to 1:2.8, and in particular from 1:2 to 1:2.6, which preferably exhibit retarded dissolution and secondary washing properties. The retarded dissolution compared to conventional amorphous sodium silicates can have been caused in a variety of ways, for example by way of surface treatment, compounding, compacting/compression or overdrying. The term "amorphous" is understood to mean that the silicates do not give sharp X-ray reflections in X-ray diffraction experiments, as is typical of crystalline substances, but at most give rise to one or more maxima of scattered X-rays having a width of several degree units of the diffraction angle.

Alternatively or in combination with the aforementioned amorphous sodium silicates, x-ray amorphous silicates can be used, the silicate particles of which provide washed or even sharp diffraction maxima in electron diffraction experiments. This is to be interpreted such that the products comprise microcrystalline regions measuring 10 to several hundred nm, values up to a maximum of 50 nm, and in particular up to a maximum of 20 nm, being preferred. Such X-ray amorphous silicates likewise have a dissolution delay compared to conventional water glasses. Compressed/compacted amorphous silicates, compounded amorphous silicates and overdried X-ray amorphous silicates are particularly preferred.

This silicate(s), preferably alkali silicates, particularly preferably crystalline or amorphous alkali disilicates, if present, are contained in detergents in amounts of 3 wt. % to 60 wt. %, preferably 8 wt. % to 50 wt. %, and in particular 20 wt. % to 40 wt. %.

It is also possible to use the generally known phosphates as builder substances, provided such use is not to be avoided for ecological reasons. Among the plurality of commercially available phosphates, the alkali metal phosphates, with particular preference for pentasodium and pentapotassium triphosphate (sodium and potassium tripolyphosphate), are of greatest importance in the detergent and cleaning agent industry. Alkali metal phosphate is the summary name for the alkali metal (in particular sodium and potassium) salts of the various phosphoric acids, in which metaphosphoric acids $(HPO_3)_n$ and orthophosphoric acid $H_3PO_4$ can be distinguished in addition to higher molecular weight representatives. The phosphates combine several advantages: They act as alkali carriers, prevent lime deposits on machine parts or lime incrustations in fabrics and also contribute to cleaning performance. Technically particularly important phosphates are pentasodium triphosphate, $Na_5P_3O_{10}$ (sodium tripolyphosphate) and the corresponding potassium salt pentapotassium triphosphate, $K_5P_3O_{10}$ (potassium tripolyphosphate). Preference is furthermore given to using sodium potassium tripolyphosphates. If phosphates are used in washing agents, preferred agents contain these phosphate(s), preferably alkali metal phosphate(s), particularly preferably pentasodium or pentapotassium triphosphate (sodium or potassium tripolyphosphate), in amounts of 5 wt. % to 80 wt. %, preferably of 15 wt. % to 75 wt. %, and in particular of 20 wt. % to 70 wt. %.

Alkali carriers can also be used. Alkaline carriers include, for example, alkali metal hydroxides, alkali metal carbonates, alkali metal hydrogen carbonates, alkali metal sesquicarbonates, the aforementioned alkali metal silicates, alkali metal silicates, and mixtures of the aforementioned substances, with preference being given to using the alkali metal carbonates, in particular sodium carbonate, sodium hydrogen carbonate or sodium sesquicarbonate. A builder system containing a mixture of tripolyphosphate and sodium carbonate can be particularly preferred. Due to their low chemical compatibility with the other ingredients of detergents compared to other builder substances, the alkali metal hydroxides are usually only used in small amounts, preferably in amounts below 10 wt. %, preferably below 6 wt. %, particularly preferably below 4 wt. % and in particular below 2 wt. %. Agents which, based on the total weight thereof, contain less than 0.5 wt. % and in particular no alkali metal hydroxides are particularly preferred. It is preferred to use carbonate(s) and/or bicarbonate(s), preferably alkali metal carbonate(s), particularly preferably sodium carbonate, in amounts of from 2 wt. % to 50 wt. %, preferably from 5 wt. % to 40 wt. % and in particular from 7.5 wt. % to 30 wt. %.

Particular organic builders that should be mentioned are polycarboxylates/polycarboxylic acids, polymeric polycarboxylates, aspartic acid, polyacetals, dextrins and phosphonates. For example, the polycarboxylic acids that can be used in the form of the free acid and/or their sodium salts are useful, with polycarboxylic acids being understood to mean those carboxylic acids that carry more than one acid function. These include, for example, citric acid, adipic acid, succinic acid, glutaric acid, malic acid, tartaric acid, maleic acid, fumaric acid, saccharic acids, aminocarboxylic acids, nitrilotriacetic acid (NTA), provided that the use thereof is not objectionable for ecological reasons, and mixtures thereof. In addition to their builder effect, the free acids typically also have the property of being an acidification component and are thus also used for setting a lower and milder pH of washing agents. Particularly noteworthy here are citric acid, succinic acid, glutaric acid, adipic acid, gluconic acid, and any mixtures thereof. Builders moreover include polymeric polycarboxylates. These are, for example, the alkali metal salts of polyacrylic acid or of polymethacrylic acid, e.g. those having a relative molar mass from 500 g/mol to 70000 g/mol. Suitable are in particular polyacrylates which preferably have a molecular mass of from 2000 g/mol to 20000 g/mol. Due to their superior solubility, the short-chain polyacrylates, which have molecular weights of 2000 g/mol to 10,000 g/mol, and particularly preferably of 3000 g/mol to 5000 g/mol, may be preferred from this group. In addition, copolymeric polycarboxylates are suitable, in particular those of acrylic acid with methacrylic acid and those of acrylic acid or methacrylic acid with maleic acid. Copolymers of acrylic acid with maleic acid which contain 50 wt. % to 90 wt. % acrylic acid and 50 wt. % to 10 wt. % maleic acid have been found to be particularly suitable. Their relative molecular mass, based on free acids, is generally 2000 g/mol to 70,000 g/mol, preferably 20,000 g/mol to 50,000 g/mol and in particular 30,000 g/mol to 40,000 g/mol. To improve water solubility, the polymers can also contain allyl sulfonic acids, such as allyloxybenzene sulfonic acid and methallyl sulfonic acid, as monomers. The (co)polymeric polycarboxylates can be used as a solid or in an aqueous solution. The content of (co-)polymeric polycarboxylates in detergents is preferably 0.5 wt. % to 20 wt. % and in particular 3 wt. % to 10 wt. %.

Biodegradable polymers composed of more than two different monomer units are also particularly preferred, for example those that contain salts of acrylic acid and of maleic acid, and vinyl alcohol or vinyl alcohol derivatives as monomers, or those that contain salts of acrylic acid and of 2-alkylallylsulfonic acid and sugar derivatives as monomers. Further preferred copolymers are those which have acrolein and acrylic acid/acrylic acid salts or acrolein and vinyl acetate as monomers. Polymeric aminodicarboxylic acids, the salts thereof or the precursors thereof should likewise be mentioned as further preferred builders. Particular preference is given to polyaspartic acids and/or salts thereof.

Another class of substances with builder properties are phosphonates. These are the salts of, in particular, hydroxyalkane or aminoalkane phosphonic acids. Among the hydroxyalkanephosphonic acids, 1-hydroxyethane-1,1-diphosphonic acid (HEDP) is of particular importance. It is used in particular as a sodium salt, with the disodium salt reacting neutrally and the tetrasodium salt reacting alkaline. Particularly suitable aminoalkanephosphonic acids are ethylenediaminetetramethylenephosphonic acid (EDTMP), diethylenetriaminepentamethylenephosphonic acid (DTPMP) and their higher homologues They are used in particular in the form of the neutrally reacting sodium salts, for example as the hexasodium salt of EDTMP or as the hepta- and octa-sodium salt of DTPMP. Mixtures of the stated phosphonates can also be used as organic builders. The aminoalkane phosphonates in particular also have a pronounced capability to bind heavy metals.

Further suitable builders are polyacetals which can be obtained by reacting dialdehydes with polyol carboxylic acids having 5 to 7 C atoms and at least 3 hydroxyl groups. Preferred polyacetals are obtained from dialdehydes such as glyoxal, glutaraldehyde, terephthalaldehyde and mixtures thereof, and from polyol carboxylic acids such as gluconic acid and/or glucoheptonic acid.

Further suitable organic builders are dextrins, for example oligomers or polymers of carbohydrates, which can be obtained by the partial hydrolysis of starches. The hydrolysis can be carried out according to customary methods, for example acid- or enzyme-catalyzed methods. These dextrins are preferably hydrolysis products having an average molar mass in the range of from 400 g/mol to 500,000 g/mol. In this case, a polysaccharide having a dextrose equivalent (DE) in the range of from 0.5 to 40, in particular from 2 to 30, is preferred, DE being a customary measure for the reducing effect of a polysaccharide compared to dextrose, which has a DE of 100. It is possible to use both maltodextrins having a DE of between 3 and 20 and dried glycose syrups having a DE of between 20 and 37, as well as what are known as yellow dextrins and white dextrins having higher molar masses in the range of from 2,000 g/mol to 30,000 g/mol. Oxidized derivatives of dextrins of this type are the reaction products thereof with oxidizing agents which are capable of oxidizing at least one alcohol function of the saccharide ring to form a carboxylic acid function.

Oxydisuccinates and other derivatives of disuccinates, preferably ethylenediamine disuccinate, are also suitable cobuilders. In this case, ethylenediamine-N,N'-disuccinate (EDDS) is preferably used in the form of the sodium or magnesium salts thereof. Glycerol disuccinates and glycerol trisuccinates are also preferred in this context. If desired, suitable use amounts are 3 wt. % to 15 wt. %, particularly in zeolite-containing and/or silicate-containing formulations.

Further suitable organic cobuilders are, for example, acetylated hydroxycarboxylic acids or the salts thereof, which optionally can also be present in lactone form and comprise at least 4 carbon atoms and at least one hydroxy group, as well as no more than two acid groups.

In addition, all compounds that are capable of forming complexes with alkaline earth metal ions can be used as builders.

Washing and cleaning agents can contain nonionic, anionic, cationic and/or amphoteric surfactants. A washing agent according to the invention preferably contains nonionic and/or anionic surfactant All non-ionic surfactants that are known to a person skilled in the art can be used as non-ionic surfactants. Detergents particularly preferably contain non-ionic surfactants from the group of alkoxylated alcohols. Nonionic surfactants that are preferably used are alkoxylated, preferably ethoxylated, particularly primary alcohols with preferably 8 to 18 C atom and, on average, 1 to 12 mols of ethylene oxide (EO) per mol of alcohol in which the alcohol residue can be linear or preferably methyl-branched in the 2 position, or it can contain linear and methyl-branched residues in admixture, as are usually present in oxa-alcohol residues However, alcohol ethoxylates having linear functional groups of alcohols of native origin having 12 to 18 C atoms, for example of coconut alcohol, palm alcohol, tallow fatty alcohol or oleyl alcohol, and an average of 2 to 8 EO per mol of alcohol, are particularly preferred. Preferred ethoxylated alcohols include C12-14 alcohols having 3 EO or 4 EO, C9-11 alcohols having 7 EO, C13-15 alcohols having 3 EO, 5 EO, 7 EO or 8 EO, C12-18 alcohols having 3 EO, 5 EO or 7 EO, and mixtures thereof, such as mixtures of C12-14 alcohol having 3 EO and C12-18 alcohol having 5 EO. The ethoxylation levels reported represent statistical averages, which may correspond to a whole or a fractional number for a specific product. Preferred alcohol ethoxylates have a narrowed homolog distribution (narrow range ethoxylates, NRE).

Alternatively or in addition to these non-ionic surfactants, fatty alcohols having more than 12 EO can also be used. Examples of these are tallow fatty alcohols having 14 EO, 25 EO, 30 EO, or 40 EO. In addition, alkyl glycosides of the general formula RO(G)x can also be used as further non-ionic surfactants, in which R is a primary straight-chain or methyl-branched, aliphatic functional group, in particular an aliphatic functional group that is methyl-branched in the 2 position, having 8 to 22, preferably 12 to 18, C atoms, and G is the symbol that represents a glycose unit having 5 or 6 C atoms, preferably glucose. The degree of oligomerization x, which indicates the distribution of mono-glycosides and oligoglycosides, is any number between 1 and 10; x is preferably between 1.2 and 1.4.

Another class of preferably used non-ionic surfactants, which are used either as the sole non-ionic surfactant or in combination with other non-ionic surfactants, are alkoxylated, preferably ethoxylated or ethoxylated and propoxylated, fatty acid alkyl esters, preferably having 1 to 4 carbon atoms in the alkyl chain.

Non-ionic surfactants of the aminoxide type, for example N-cocoalkyl-N,N-dimethylamine oxide and N-tallow-alkyl-N,N-dihydroxyethylamine oxide, and of the fatty acid alkanolamides may also be used. The quantity of these non-ionic surfactants is preferably no more than that of the ethoxylated fatty alcohols, in particular no more than half thereof.

Other suitable surfactants are polyhydroxy fatty acid amides of the formula,

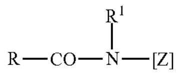

in which R represents an aliphatic acyl functional group having 6 to 22 carbon atoms, $R^1$ represents hydrogen, an alkyl or hydroxy alkyl functional group having 1 to 4 carbon atoms and [Z] represents a linear or branched polyhydroxyalkyl functional group having 3 to 10 carbon atoms and 3 to 10 hydroxyl groups. The polyhydroxy fatty acid amides are known substances that can usually be obtained by the reductive amination of a reducing sugar with ammonia, an alkyl amine or an alkanol amine, and subsequent acylation with a fatty acid, a fatty acid alkyl ester or a fatty acid chloride. The group of polyhydroxy fatty acid amides also includes compounds of the formula

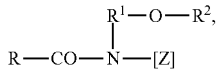

in which R represents a linear or branched Alkyl or alkenyl radical having 7 to 12 carbon atoms, $R^1$ is a linear, branched or cyclic Alkyl radical or an aryl radical having 2 to 8 carbon atoms and $R^2$ is a linear, branched or cyclic Alkyl radical or an aryl radical or an oxyalkyl radical having 1 to 8 carbon atoms, where $C_{1-4}$ alkyl or phenyl radicals are preferred and [Z] is a linear polyhydroxyalkyl radical whose alkyl chain is substituted with at least two hydroxyl groups, or alkoxylated, preferably ethoxylated or propoxylated derivatives of this radical. [Z] is preferably obtained by the reductive amination of a reduced sugar, for example glucose, fructose, maltose, lactose, galactose, mannose or xylose. The N-alkoxy- or N-aryloxy-substituted compounds can be converted into the desired polyhydroxy fatty acid amides by reaction with fatty acid methyl esters in the presence of an alkoxide as a catalyst.

In cleaning agents, non-ionic surfactants are preferred from the group of alkoxylated alcohols, particularly preferably from the group of mixed alkoxylated alcohols and in particular from the group of EO/AO/EO nonionic surfactants, or the PO/AO/PO nonionic surfactants, especially the PO/EO/PO nonionic surfactants. Such (PO/EO/PO) nonionic surfactants are characterized by good foam control.

Anionic surfactants that are used are those of the sulfonate and sulfate types, for example. Surfactants of the sulfonate type that can be used are preferably $C_{9-13}$ alkylbenzene sulfonates, olefin sulfonates, i.e. mixtures of alkene and hydroxyalkane sulfonates, and disulfonates, as obtained, for example, from $C_{12-18}$ monoolefins having a terminal or internal double bond by way of sulfonation with gaseous sulfur trioxide and subsequent alkaline or acid hydrolysis of the sulfonation products. Also suitable are alkane sulfonates obtained from $C_{12-18}$ alkanes, for example by way of sulfochlorination or sulfoxidation with subsequent hydrolysis or neutralization. Likewise, the esters of α-sulfofatty acids (ester sulfonates) are suitable, for example the α-sulfonated methyl esters of hydrogenated coconut fatty acids, palm kernel fatty acids or tallow fatty acids.

Sulfated fatty acid glycerol esters are further suitable anionic surfactants. Fatty acid glycerol esters shall be understood to mean the monoesters, diesters and triesters and the mixtures thereof, as they are obtained during production by way of the esterification of a monoglycerol with 1 to 3 moles fatty acid or during the transesterification of triglycerides with 0.3 to 2 moles glycerol. Preferred sulfated fatty acid glycerol esters are the sulfation products of saturated fatty acids with 6 to 22 carbon atoms, for example caproic acid, caprylic acid, capric acid, myristic acid, lauric acid, palmitic acid, stearic acid or behenic acid.

The alkali salts and in particular the sodium salts of the sulfuric acid half-esters of $C_{12}$-$C_{18}$ fatty alcohols, for example from coconut fatty alcohol, tallow fatty alcohol, lauryl alcohol, myristyl alcohol, cetyl alcohol or stearyl alcohol, or of $C_{10}$-$C_{20}$-oxo alcohols and those half esters of secondary alcohols of these chain lengths are preferred. Alk(en)yl sulfates of the mentioned chain length that contain a synthetic straight-chain alkyl functional group prepared on a petrochemical basis and have a degradation behavior similar to that of the adequate compounds based on fat chemical raw materials are also preferred. From a washing perspective, $C_{12}$-$C_{16}$ ai-sulfates, $C_{12}$-$C_{15}$ alkyl sulfates and $C_{14}$-$C_{15}$ alkyl sulfates are preferred.

The sulfuric acid monoesters of straight-chain or branched $C_{7-21}$ alcohols ethoxylated having 1 to 6 mol ethylene oxide, such as 2-methyl-branched $C_{9-11}$ alcohols having, on average, 3.5 mol ethylene oxide (EO) or $C_{12-18}$ fatty alcohols having 1 to 4 EO, are also suitable. Due to the high foaming behavior, they are used only in relatively small amounts in cleaning agents, for example in amounts of 1 to 5 wt. %.

Other suitable anionic surfactants are the salts of alkylsulfosuccinic acid, which are also referred to as sulfosuccinates or sulfosuccinic acid esters and which represent monoesters and/or diesters of sulfosuccinic acid with alcohols, preferably fatty alcohols and in particular ethoxylated fatty alcohols. Preferred sulfosuccinates contain $C_{8-18}$ fatty alcohol residues or mixtures of these. Particularly preferred sulfosuccinates contain a fatty alcohol residue which is derived from ethoxylated fatty alcohols, which in themselves represent nonionic surfactants. Sulfosuccinates, whose fatty alcohol residues are derived from ethoxylated fatty alcohols with a narrow homolog distribution, are particularly preferred. Likewise, it is also possible to use alk(en)yl succinic acid having preferably 8 to 18 carbon atoms in the alk(en)yl chain, or the salts thereof.

Further anionic surfactants that can also be used are in particular soaps. Saturated fatty acid soaps, such as the salts of lauric acid, myristic acid, palmitic acid, stearic acid, hydrogenated erucic acid and behenic acid, as well as soap mixtures derived in particular from natural fatty acids, e.g. coconut, palm kernel or tallow fatty acids, are suitable.

The anionic surfactants, including the soaps, can be present in the form of the sodium, potassium or ammonium salts thereof, or as soluble salts of organic bases, such as mono-, di- or triethanolamine. The anionic surfactants are preferably present in the form of the sodium or potassium salts thereof, in particular in the form of the sodium salts.

Cationic and/or amphoteric surfactants can also be used instead of the surfactants mentioned or in conjunction with them.

Cationic active substances which can be used are, for example, cationic compounds of the following formulae:

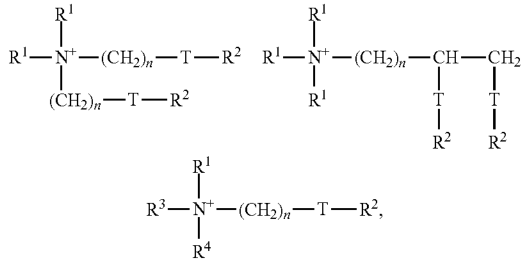

wherein each group $R^1$ is independently selected from $C_{1-6}$ Alkyl, alkenyl or hydroxyalkyl groups; each group $R^2$ is independently selected from $C_{8-28}$Alkyl or Alkenyl groups; $R^3$=$R^1$ or $(CH_2)_n$-T-$R^2$$R^4$=$R^1$ or $R^2$ or $(CH_2)_n$-T-$R^2$T= —$CH_2$—, —O—CO— or —CO—O— and n is an integer from 0 to 5.

Textile-softening compounds can be used for the care of textiles and for improving the textile properties such as a softer "handle" (conditioning) and reduced electrostatic charge (increased wearing comfort). The active ingredients of these formulations are quaternary ammonium compounds with two hydrophobic radicals, such as, for example, the diesteraryldimethylammonium chloride, which, however, is increasingly replaced by quaternary ammonium compounds due to its inadequate biodegradability, which, in their hydrophobic radicals, contain esterquats as predetermined breaking points for biodegradation.

Such "esterquats" with improved biodegradability are obtainable, for example, in that mixtures of methyldiethanolamine and/or triethanolamine are esterified with fatty acids, and the reaction products are subsequently quaternized with alkylating agents in a manner known per se. Dimethylolethylene urea is further suitable as an appeal.

Enzymes can be used to increase the performance of washing agents. These include, in particular, proteases, amylases, lipases, hemicellulases, cellulases, perhydrolases, or oxidoreductases, as well as preferably mixtures thereof. These enzymes are in principle of natural origin; starting from the natural molecules, variants that have been improved for use in washing or cleaning agents are available, which are preferably used accordingly. Detergents preferably contain enzymes in total quantities of from $1 \times 10^{-6}$ wt. % to 5 wt. % based on active protein. The protein concentration can be determined using known methods, for example the BCA method or the Biuret method.

Among the proteases, subtilisin-type proteases are preferred. Examples of these are the subtilisins BPN' and Carlsberg, as well as the developed forms thereof, protease PB92, subtilisins 147 and 309, the alkaline protease from *Bacillus lentus*, subtilisin DY, and the enzymes thermitase, proteinase K and proteases TW3 and TW7, which belong to the subtilases but no longer to the subtilisins in the narrower sense.

Examples of amylases that can be used are the α-amylases from *Bacillus licheniformis*, from *B. amyloliquefaciens*, from *B. stearothermophilus*, from *Aspergillus niger* and *A. oryzae* as well as the further developments of the aforementioned amylases that have been improved for use in detergents and cleaning agents Others that are particularly noteworthy for this purpose are the α-amylases from *Bacillus* sp. A 7-7 (DSM 12368) and cyclodextrin glucanotransferase (CGTase) from B. agaradherens (DSM 9948).

Lipases or cutinases can be used because of their triglyceride-cleaving activity. These include, for example, the lipases originally available from *Humicola lanuginosa* (*Thermomyces lanuginosus*) or further developed from them, in particular those with the amino acid exchange D96L. Moreover, the cutinases which have been originally isolated from *Fusarium solani pisi* and *Humicola insolens* can also be used, for example. Lipases and/or cutinases of which the starting enzymes have been isolated originally from *Pseudomonas mendocina* and *Fusarium solanii* can also be used.

Moreover, enzymes can be used which can be grouped together under the term "hemicellulases". These include, for example, mannanases, xanthan lyases, pectin lyases (=pectinases), pectinesterases, pectate lyases, xyloglucanases (=xylases), pullulanases, and β-glucanases.

In order to increase the bleaching effect, oxidoreductases such as oxidases, oxygenases, catalases, peroxidases such as halo-, chloro-, bromo-, lignin, glucose, or manganese peroxidases, dioxygenases or laccases (phenoloxidases, polyphenoloxidases) can be used according to the invention. Advantageously, organic, particularly preferably aromatic compounds that interact with the enzymes are additionally added in order to potentiate the activity of the relevant oxidoreductases (enhancers) or, in the event of greatly differing redox potentials, to ensure the flow of electrons between the oxidizing enzymes and the stains (mediators).

The enzymes can be used in any form established according to the prior art. These include, for example, the solid preparations obtained by granulation, extrusion or lyophilization or, in particular in the case of liquid or gel-like agents, solutions of the enzymes, advantageously as concentrated as possible, with little water and/or containing stabilizers. Alternatively, the enzymes can be encapsulated both for the solid and for the liquid administration form, for example by means of spray-drying or extrusion of the enzyme solution together with a preferably natural polymer or in the form of capsules, for example those in which the enzymes are enclosed as in a solidified gel, or in those of the core-shell type, in which an enzyme-containing core is coated with a protective layer that is impermeable to water, air and/or chemicals. Further active ingredients, for example, stabilizers, emulsifiers, pigments, bleaches or dyes can additionally be applied in overlaid layers. Such capsules are made using methods that are known per se, for example by means of vibratory granulation or roll granulation or by means of fluid bed processes. Advantageously, such granules are low in dust, for example due to the application of polymeric film formers, and are stable in storage due to the coating. Furthermore, it is possible to formulate two or more enzymes together such that a single granule exhibits a plurality of enzyme activities.

Preferably, one or more enzymes and/or enzyme preparations, preferably protease preparations and/or amylase preparations, are used in amounts of 0.1 wt. % to 5 wt. %, preferably 0.2 wt. % to 4.5 wt. %, and in particular 0.4 wt. % to 4 wt. %.

Individual fragrance compounds, e.g. synthetic products of the ester, ether, aldehyde, ketone, alcohol and hydrocarbon type, can be used as perfume oils or fragrances. However, mixtures of different odorants are preferably used which together produce an appealing fragrance note. Perfume oils of this kind can also contain natural odorant mixtures, as are obtainable from plant sources, e.g. pine, citrus, jasmine, patchouli, rose or ylang-ylang oil. If it is to be perceptible, an odorant has to be volatile, with the molar mass, in addition to the nature of the functional groups and the structure of the chemical compound, also playing an important role. Most fragrances have molecular weights of up to around 200 g/mol, while molecular weights of 300 g/mol and above tend to be an exception. Due to the different volatility of fragrances, the smell of a perfume or fragrance composed of several fragrances changes during evaporation, wherein the olfactory impressions are divided into "top note", "middle note or body" and "base note" (end note or dry out). Because the perception of an odor also depends to a large extent on the odor intensity, the top note of a perfume or fragrance is not made up only of highly volatile compounds, whereas the end note comprises for the most part less volatile, i.e. adherent odorants. In the composition of perfumes, more volatile odorants can be bound, for example, to specific fixatives, which prevents them from evaporating too quickly. The division of odorants into "more volatile" and "adherent" odorants below thus provides no information about the impression of the odor and whether the corresponding odorant is perceived as a top note or middle note. The fragrances can be processed directly, but it may also be advantageous to apply the fragrances to carriers, which ensure long-lasting fragrance through slower fragrance release. Cyclodextrins, for example, have been found to be suitable as such carrier materials, it being possible for the cyclodextrin-perfume complexes to be coated with further auxiliaries.

When choosing the colorant, it must be taken into account that the colorants have a high storage stability and are insensitive to light as well as not having a strong affinity for textile surfaces and in particular for synthetic fibers. At the same time, it must also be taken into account that coloring agents can have different stabilities with respect to oxidation. In general, water-insoluble colorants are more stable with respect to oxidation than water-soluble colorants. The concentration of the colorant in the detergents varies depending on the solubility and thus also on the sensitivity to oxidation. In the case of highly water-soluble colorants, colorant concentrations in the range of from a few $10^{-2}$ wt. % to $10^{-3}$ wt. % are typically selected. In the case of the pigment dyes, which are particularly preferred because of their brightness, but which are less water-soluble, the suitable concentration of the colorant in detergents is typically a few $10^{-3}$ wt. % to $10^{-4}$ wt. %. Coloring agents which can be oxidatively destroyed in the washing process and mixtures thereof with suitable blue dyes, so-called bluers, are preferred. It has proven advantageous to use coloring agents which are soluble in water or at room temperature in liquid organic substances. Suitable examples are anionic colorants, for example anionic nitrosodyes.

In addition to the components mentioned so far, the detergents can contain other ingredients that further improve the application-related and/or aesthetic properties of these agents. Preferred agents include one or more substances from the group of electrolytes, pH adjusters, fluorescent agents, hydrotopes, suds suppressors, silicone oils, antiredeposition agents, optical brighteners, graying inhibitors, run-in preventer agents, wrinkle protection agents, dye transfer inhibitors, antimicrobial active ingredients, germicides, fungicides, antioxidants, antistatic agents, ironing aids, hydrophobizing and impregnating agents, swelling and sliding solids, and UV absorbers.

A wide number of different salts can be used as electrolytes from the group of the inorganic salts. Preferred cations are the Alkali and alkaline earth metals, preferred anions are the halides and sulfates. From a manufacturing point of view, the use of NaCl or $MgCl_2$ in the detergents is preferred.

In order to bring the pH value of detergents into the desired range, the use of pH adjusters may be advisable. All known acids or alkalis can be used here, provided that their use is not prohibited for practical or ecological reasons or for reasons of consumer protection. The amount of these adjusters usually does not exceed 1 wt. % of the total formulation.

Useful foam inhibitors include soaps, oils, fats, paraffins or silicone oils, which may optionally be applied to carrier materials. Suitable carrier materials are, for example, inorganic salts such as carbonates or sulfates, cellulose derivatives or silicates, and mixtures of the aforementioned materials. In the context of the present application, preferred agents contain paraffins, preferably unbranched paraffins (n-paraffins) and/or silicones, preferably linear-polymeric silicones, which according to the scheme $(R_2SiO)_x$ are constructed and also referred to as silicone oils. These silicone oils usually represent clear, colorless, neutral, odorfree, hydrophobic liquids having a molecular weight of between 1000 g/mol and 150,000 g/mol and viscosities of between 10 mPa·s and 1,000,000 mPa·s.

Suitable antiredeposition agents are, for example, nonionic cellulose ethers such as Methylcellulose and methylhydroxypropyl cellulose with a proportion of methoxy groups of 15 to 30 wt. % and hydroxypropyl groups of 1 to 15 wt. %, based in each case on the nonionic cellulose ether.

As soil repellents, the polymers of phthalic acid and/or terephthalic acid or derivatives thereof, in particular polymers of ethylene terephthalate and/or polyethylene glycol terephthalate or anionically and/or non-ionically modified derivatives thereof, are known from the prior art. Of these, the sulfonated derivatives of phthalic acid polymers and terephthalic acid polymers are particularly preferred.

Optical brighteners can be added to detergents in particular to eliminate graying and yellowing of the treated textiles. These substances are absorbed by the fiber and have a brightening and simulated bleaching effect by converting invisible ultraviolet radiation into visible longer-wave light, the ultraviolet light absorbed from the sunlight being emitted as slightly bluish fluorescence and, together with the yellow tone of the grayed or yellowed laundry, produces pure white. Suitable compounds come, for example, from the substance classes of 4,4'-diamino-2,2'-stilbendisulfonic acids (flavonic acids), 4,4'-distyryl-biphenyls, methylumbelliferones, coumarins, dihydroquinolinones, 1,3-diarylpyrazolines, naphthalamides, benzoxazole, benzisoxazole and benzimidazole systems as well as the pyrene derivatives substituted by heterocycles.

The function of graying inhibitors is to keep the dirt that is removed from the fiber suspended in the liquor and in this way prevent redeposition of the dirt. Water-soluble colloids, which are usually organic, are suitable for this purpose, for example the water-soluble salts of polymeric carboxylic acids, sizing material, gelatin, salts of ethersulfonic acids of starch or of cellulose, or salts of acidic sulfuric acid esters of cellulose or of starch. Water-soluble polyamides containing acid groups are also suitable for this purpose. Furthermore, soluble starch preparations can be used, for example degraded starch and/or aldehyde starches. Polyvinylpyrrolidone is also suitable. Cellulose ethers such as carboxymethyl cellulose (Na salt), methyl cellulose, hydroxyalkyl cellulose and mixed ethers such as methylhydroxyethyl cellulose, methylhydroxypropyl cellulose, methylcarboxy methyl cellulose and mixtures thereof can also be used as graying inhibitors.

Since textile fabrics, especially made of rayon, rayon, cotton and mixtures thereof, can tend to crease because the individual fibers are sensitive to bending, kinking, pressing and squeezing transversely to the fiber direction, synthetic anti-crease agents can be used. These include, for example, synthetic products based on fatty acids, fatty acid esters, fatty acid amides, alkylol esters, alkylolamides or fatty alcohols, which are usually reacted with ethylene oxide, or products based on Lecithin or modified phosphoric esters.

Phoping and impregnation methods are used for finishing textiles with substances which prevent the deposition of dirt or facilitate its washing out. Preferred hydrophobizing and impregnating agents are perfluorinated fatty acids, also in the form of their aluminum and zirconium salts, organic silicates, silicones, polyacrylic esters with perfluorinated alcohol component or polymerisable compounds coupled with perfluorinated acyl or sulfonyl residue. Antistatic agents can also be present. The soil-repellent equipment with hydrophobizing and impregnating agents is often classified as a care-based equipment. The penetration of the impregnating agents in the form of solutions or emulsions of the active substances in question can be facilitated by adding wetting agents which reduce the surface tension. A further field of use of hydrophobizing and impregnating agents is the water-repellant finishing of textile goods, tent, tarpaulins, leather, etc., in which, in contrast to water sealing, the fabric pores are not closed, i.e. the fabric remains breathable (hydrophobization). The hydrophobizing agents used for hydrophobing are subjected to textiles, leather, paper, wood, etc. with a very thin layer of hydrophobic groups, such as longer Alkyl chains or siloxane groups. Suitable hydrophobizing agents are, for example, paraffins, waxes, metal soaps, etc. with additives of aluminum or zirconium salts, quaternary ammonium compounds with long-chain alkyl radicals, urea derivatives, fatty acid-modified melamine resins, chromium complex salts, silicones, tin-organic compounds and gluten dialdehyde and perfluorinated compounds. The hydrophobized materials do not feel greasy. Nevertheless, in a manner similar to that of stored substances, drops of water on them are removed, without the use of a mesh. For example, silicone-impregnated textiles have a soft handle and are water and dirt repellent; stains from ink, wine, fruit juices and the like are easier to remove.

Antimicrobial active ingredients can be used for combating microorganisms. Depending on the antimicrobial spectrum and mechanism of action, a distinction is made between bacteriostatics and bactericides, fungistatics and fungicides. Substances from these groups are, for example, benzalkonium chlorides, alkylarylsulfonates, halophenols and phenol mercuriacetate, wherein these compounds can also be dispensed with entirely.

In order to prevent undesirable changes to the detergents and cleaning agents and/or the treated textiles caused by exposure to atmospheric oxygen and other oxidative processes, the agents can contain antioxidants. This class of compounds includes, for example, substituted phenols, hydroquinones, catechols and aromatic amines as well as organic sulfides, polysulfides, dithiocarbamates, phosphites and phosphonates.

Increased wearing comfort can result from the additional use of antistatic agents. Antistatic agents increase the surface conductivity and thus enable the charges that have formed to flow off better. External antistatic agents are generally substances having at least one hydrophilic molecular ligand and give the surfaces a more or less hygroscopic film. These mostly surface-active antistatic agents can be divided into nitrogen-containing (amines, amides, quaternary ammonium compounds), phosphorus-containing (phosphoric acid esters) and sulfur-containing (alkyl sulfonates, alkyl sulfates) antistatic agents. Lauryl (or stearyl) dimethylbenzylammonium chlorides are likewise suitable as antistatic agents for textiles or as an additive to washing agents, wherein a conditioning effect is additionally achieved.

To improve the water absorption capacity, the rewettability of the treated textiles and to make ironing of the treated textiles easier, silicone derivatives can be used in textile detergents. These additionally improve the rinsing behavior of detergents through their foam-inhibiting properties. Preferred silicone derivatives are, for example, polydialkyl- or alkylarylsiloxanes in which the alkyl groups have one to five C atoms and are completely or partially fluorinated. Preferred silicones are polydimethylsiloxanes which may optionally be derivatized and are then amino-functional or quaternized or have Si—OH, Si—H and/or Si—CI bonds. Further preferred silicones are the polyalkylene oxide-modified polysiloxanes, i.e. polysiloxanes which have, for example, polyethylene glycols, and the polyalkylene oxide-modified dimethylpolysiloxanes.

Finally, UV absorbers can also be used, which absorb onto the treated textiles and improve the light resistance of the fibers. Compounds which have these desired properties are, for example, the compounds and derivatives of benzophenone which have substituents in the 2- and/or 4-position and are effective by radiationless deactivation. Substituted benzotriazoles, acrylates (cinnamic acid derivatives) that are phenyl-substituted in the 3-position, optionally having cyano groups in the 2 position, salicylates, organic Ni complexes and natural substances such as umbelliferone and the endogenous urocanic acid are also suitable.

Protein hydrolyzates are further suitable active substances due to their fiber-care action. Protein hydrolysates are product mixtures that are obtained through acidic, basic or enzymatically catalyzed degradation of proteins. Protein hydrolyzates of both plant and animal juices can be used. Animal protein hydrolysates are, for example, elastin, collagen, keratin, silk and milk egg white protein hydrolysates, which can also be in the form of salts. The use of protein hydrolysates of plant origin, e.g. soy, almond, rice, pea, potato and wheat protein hydrolysates, is preferred. Although the use of protein hydrolyzates as such is preferred, amino acid mixtures obtained otherwise or individual amino acids such as, for example, arginine, lysine, histidine or pyroglutamic acid can optionally also be used. It is likewise possible to use derivatives of the pro-hydrolyzates, for example in the form of their fatty acid condensation products.

The detergents can be in the form of shaped bodies. In order to facilitate the disintegration of such prefabricated shaped bodies, it is possible to incorporate disintegration aids, so-called tablet disintegrants, into these agents in order to shorten the disintegration times. Tablet disintegrants or disintegration accelerators are understood as meaning auxiliaries which ensure the rapid disintegration of tablets in water or other media and the rapid release of the active ingredients. Disintegration aids can preferably be used in amounts of 0.5 to 10 wt. %, preferably 3 to 7 wt. % and in particular 4 to 6 wt. %, based in each case on the total weight of the agent containing the disintegration aid.

The detergents described herein can be present in a pre-finished manner in metering units. These dosage units preferably include the amount of agent necessary for one wash cycle. Preferred dosage units have a weight between 10 g and 50 g, preferably between 15 g and 40 g. The volume of the aforementioned metering units and the three-dimensional shape thereof are particularly preferably selected so that the pre-packaged units can be metered via the metering chamber of a washing machine. The volume of the dosing unit is therefore preferably between 10 and 35 ml, preferably between 12 and 30 ml.

The detergents, in particular the prefabricated dosage units, particularly preferably have a water-soluble coating. The water-soluble wrapping is preferably made from a water-soluble film material, which is selected from the group consisting of polymers or polymer mixtures. The wrapping may be made up of one or of two or more layers of the water-soluble film material. The water-soluble film material of the first layer and of the additional layers, if present, may be the same or different. Particularly preferred are films which, for example, can be glued and/or sealed to form packaging such as tubes or sachets after they have been filled with an agent.

The water-soluble packaging may have one or more chambers. The agent may be contained in one or more chambers, if present, of the water-soluble wrapping.

It is preferable for the water-soluble wrapping to contain polyvinyl alcohol or a polyvinyl alcohol copolymer. Water-soluble wrappings containing polyvinyl alcohol or a polyvinyl alcohol copolymer exhibit good stability with a sufficiently high level of water solubility, in particular cold-water solubility. Suitable water-soluble films for producing the water-soluble wrapping are preferably based on a polyvinyl alcohol or a polyvinyl alcohol copolymer of which the molecular weight is in the range of from 10,000 to 1,000,000 g/mol, preferably from 20,000 to 500,000 g/mol, particularly preferably from 30,000 to 100,000 g/mol, and in particular from 40,000 to 80,000 g/mol. Polyvinyl alcohol is usually prepared by hydrolysis of polyvinyl acetate, since the direct synthesis route is not possible. The same applies to polyvinyl alcohol copolymers, which are prepared accordingly from polyvinyl acetate copolymers. It is preferable for at least one layer of the water-soluble wrapping to include a polyvinyl alcohol of which the degree of hydrolysis is 70 mol. % to 100 mol. %, preferably 80 mol. % to 90 mol. %, particularly preferably 81 mol. % to 89 mol. %, and in particular 82 mol. % to 88 mol. %. A polyvinyl alcohol-containing film material suitable for producing the water-soluble coating can additionally be given a polymer selected from the group comprising (meth)acrylic acid-containing (co)polymers, polyacrylamides, oxazoline polymers, polystyrene sulfonates, polyurethanes, polyesters, polyethers, polylactic acid or mixtures of the above polymers can be added. Polylactic acids are a preferred additional polymer. Preferred polyvinyl alcohol copolymers include, in addition to vinyl alcohol, dicarboxylic acids as further monomers. Suitable dicarboxylic acids are itaconic acid, malonic acid, succinic acid and mixtures thereof, itaconic acid being preferred. Polyvinyl alcohol copolymers which include, in addition to vinyl alcohol, an ethylenically unsaturated carboxylic acid or the salt or ester thereof, are also preferred. Polyvinyl alcohol copolymers of this kind particularly preferably contain, in addition to vinyl alcohol, acrylic acid, methacrylic acid, acrylic acid ester, methacrylic acid ester or mixtures thereof. It may be preferable for the film material to contain further additives. The film material may contain plasticizers such as dipropylene glycol, ethylene glycol, diethylene glycol, propylene glycol, glycerol, sorbitol, mannitol or mixtures thereof, for example. Further additives include, for example, release aids, fillers, cross-linking agents, surfactants, antioxidants, UV absorbers, anti-blocking agents, anti-adhesive agents or mixtures thereof. Suitable water-soluble films for use in the water-soluble wrappings of the water-soluble packaging according to the invention are films which are sold by MonoSol LLC, for example under the names M8630, C8400 or M8900. Other suitable films include films with the name Solublon® PT, Solub-Ion® GA, Solublon® KC or Solublon® KL by Aicello Chemical Europe GmbH or the VF-HP films by Kuraray.

EXAMPLES

Example 1 Preparation of Substituted Anthracenediones a) Synthesis of 1.2-bis(octyloxy)anthracene-9,10-dione

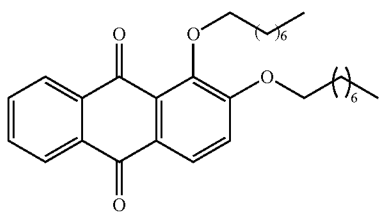

Based on published procedures (X. Chen, K. Ding, L. Jun, Synthesis, identification and application of aldehyde reactive dyes, Dyes and Pigments 2015, 123, 404-412 and Ioannis Drivas, Richard S. Blackburn, Christopher M. Rayner, Natural anthraquinonoid colorants as platform chemicals in the synthesis of sustainable disperse dyes for polyesters, Dyes and Pigments 2011, 88, 7-17) a mixture of 30 ml dimethylacetamide, 2.00 g alizarin (8.30 mmol) and 3.50 g of potassium carbonate (25 mmol) heated to 80° C. and reacted with each other for 30 min. 4.80 g of 1-bromooctane (25 mmol) were then added, and the reaction mixture was stirred for a further 16 h. To terminate the reaction, the mixture was cooled to room temperature and admixed with dimethylacetamide. The mixture was filtered and the residue was washed with dimethylacetamide until a yellow solid was apparent. The residue was then dried under reduced pressure. This gave 1,2-bis(octyloxy)anthracene-9,10-dione (M1) as a yellow solid with a yield of 94%.

b) Preparation of Further 1,2-bis(alkyloxy)anthracene-9,10-diones

Analogously to the procedure described in a), 1,2-bis(decyloxy)anthracene-9,10-dione (M2), 1,2-bis(dodecyloxy)anthracene-9,10-dione (M3) and 1,2-bis(hexadecyloxy)anthracene-9,10-dione (M4) were prepared.

Example 2: Degradation of Lycopene

Using a simplified model reaction, the decolorization of the red dye lycopene, which comes from tomatoes, was visualized and characterized using a UV/VIS spectrum. For this purpose, the same volume parts of a solution of 0.01 mM lycopene in chloroform and a solution of 0.0001 mM in each case of a compound prepared in example 1 in chloroform were mixed in a cuvette and the cuvette was placed in a specord S600 spectrometer, analytik jena, measuring shaft surface 480 nm. With the smallest possible distance between the cuvette and a blue light-emitting LED lamp (450 nm), the kinetics of the degradation of the dye lycopene were determined. The data given in Table 1 below resulted.

TABLE 1

Degradation of lycopene, pseudo 1st order reaction

| Photo-activator | K [$min^{-1}$] | $t_{1/2}$ [min] | Absorption maximum (t = 0 min) [a.u.] | Absorption maximum (t = 5 min) [a.u.] | Degradation [%] |
|---|---|---|---|---|---|
| — | 0.006 | 107 | 1.00 | 0.98 | 2 |
| M1 | 0.28 | 2.5 | 1.00 | 0.40 | 60 |
| M2 | 0.28 | 2.5 | 1.00 | 0.47 | 53 |
| M3 | 0.28 | 2.5 | 1.00 | 0.51 | 49 |
| M4 | 0.28 | 2.5 | 1.00 | 0.53 | 47 |

Example 3: Degradation of β-carotene

Example 2 was repeated using the yellow dye β-carotene, which comes from carrots among other things, instead of lycopene and a measuring wavelength of 463 nm. The data given in Table 2 below resulted.

TABLE 2

Degradation of β-carotene, pseudo 1st order reaction

| Photo-activator | K [$min^{-1}$] | $t_{1/2}$ [min] | Absorption maximum (t = 0 min) [a.u.] | Absorption maximum (t = 5 min) [a.u.] | Degradation [%] |
|---|---|---|---|---|---|
| — | 0.027 | 29 | 1.00 | 0.87 | 13 |
| M1 | 0.31 | 2 | 1.00 | 0.17 | 83 |
| M2 | 0.31 | 2 | 1.00 | 0.20 | 80 |
| M3 | 0.31 | 2 | 1.00 | 0.22 | 78 |
| M4 | 0.31 | 2 | 1.00 | 0.27 | 73 |

The invention claimed is:

1. A washing agent comprising alkyloxy-substituted anthracene-9,10-dione of the general formula (I), (I)

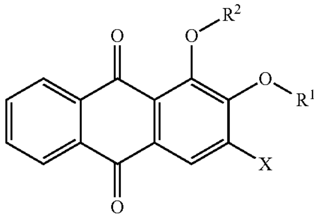

in which $R^1$ and $R^2$ independently of one another is H, $SO_3^-M^+$ or an optionally substituted linear or branched alkyl radical having 1 to 20 C atoms, with the proviso that at least one of the radicals $R^1$ or $R^2$ is an optionally substituted linear or branched alkyl radical having 1 to 20 C atoms, X is H or $SO_3^-M^+$ and $M^+$ is a proton, an alkali metal ion or an ammonium ion or mixtures thereof; and a nonionic, anionic, cationic, and/or amphoteric surfactant.

2. The agent according to claim 1, characterized in that it contains 0.00001 wt. % to 1 wt. % of alkyloxy-substituted anthracene-9,10-dione of the general formula (I).

3. The agent according to claim 1, characterized in that it is liquid.

4. The agent according to claim 1, characterized in that it does not contain any bleaching agents.

5. The agent according to claim 1, characterized in that it is present as a prefabricated dosage unit with a water-soluble coating.

6. A method for removing stains from textile materials comprising adding an Alkyloxy-substituted anthracene-9,10-diones of the general formula (I), (I)

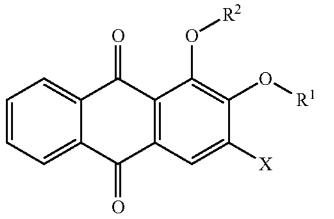

in which $R^1$ and $R^2$ independently of one another is H, $SO_3^-M^+$ or an optionally substituted linear or branched alkyl radical having 1 to 20 C atoms, with the proviso that at least one of the radicals $R^1$ or $R^2$ is an optionally substituted linear or branched alkyl radical having 1 to 20 C atoms, x is H or $SO_3^-M^+$ and $M^+$ is a proton, an alkali metal ion or an ammonium ion or mixtures thereof, in an aqueous washing liquid in which the washing in need of textile materials is located, and irradiating the aqueous washing liquid with visible light.

7. The method according to claim 6, characterized in that light in the wavelength range from 400 nm to 600 nm is used.

8. The method according to claim 6, characterized in that the alkyloxy-substituted anthracene-9,10-dione of the general formula (I) is used in concentrations in the range from 0.0001 mmol/l to 0.1 mmol/l in aqueous washing liquor.

9. The agent according to claim 1, characterized in that, in formula (I), $R^1$ and $R^2$ is independently an optionally substituted linear or branched alkyl radical having 1 to 20 C atoms, and/or $R^1$ and $R^2$ is substituted and substituents selected from —OH, —$COO^-M$, —$SO_3^-M$, —$OSO_3^-M$, —$N(CH_2CH_3)_3Hal^-$, wherein $M^+$ for a proton, an alkali metal ion, an ammonium ion and mixtures thereof and $Hal^-$ for $Cl^-$, $Br^-$, $J^-$, $F^-$ and mixtures thereof and $M^+$ and $Hal^-$ can also be missing if —$COO^-$, —$SO_3^-$, and —$OSO_3^-$ and —$N(CH_2CH_3)_3$ are present in charge-balancing quantity.

10. The method according to claim 6, characterized in that, in formula (I), $R^1$ and $R^2$ is independently an optionally substituted linear or branched alkyl radical having 1 to 20 C atoms, and/or $R^1$ and $R^2$ is substituted and substituents selected from —OH, —$COO^-M$, —$SO_3^-M$, —$OSO_3^-M$, —$N(CH_2CH_3)_3Hal^-$, wherein $M^+$ for a proton, an alkali metal ion, an ammonium ion and mixtures thereof and $Hal^-$ for $Cl^-$, $Br^-$, $J^-$, $F^-$ and mixtures thereof and $M^+$ and $Hal^-$ can also be missing if —$COO^-$, —$SO_3^-$, and —$OSO_3^-$ and —$N(CH_2CH_3)_3$ are present in charge-balancing quantity.

11. The agent according to claim 1, characterized in that it contains 0.001 wt. % to 0.1 wt. % of alkyloxy-substituted anthracene-9,10-dione of the general formula (I).

12. The method according to claim 6, characterized in that light in the wavelength range from 450 nm to 525 nm is used.

13. The method according to claim 6, characterized in that the alkyloxy-substituted anthracene-9,10-dione of the general formula (I) is used in concentrations in the range from 0.001 mmol/l to 0.01 mmol/l in aqueous washing liquor.

14. A washing agent comprising alkyloxy-substituted anthracene-9,10-dione of the general formula (I), (I)

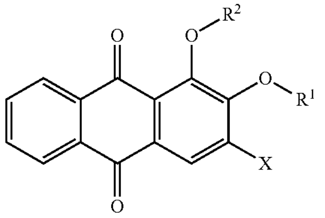

in which $R^1$ and $R^2$ independently of one another is H, $SO_3^-M^+$ or an optionally substituted linear or branched alkyl radical having 1 to 20 C atoms, with the proviso that at least one of the radicals $R^1$ or $R^2$ is an optionally substituted linear or branched alkyl radical having 1 to 20 C atoms, X is H or $SO_3^-M^+$ and $M^+$ is a proton, an alkali metal ion or an ammonium ion or mixtures thereof, characterized in that the washing agent is present as a prefabricated dosage unit with a water-soluble coating.

* * * * *